United States Patent [11] 3,548,088

[72] Inventors Satoshi Shimada;
Yasuharu Kubota, Tokyo, Japan
[21] Appl. No. 799,241
[22] Filed Feb. 14, 1969
[45] Patented Dec. 15, 1970
[73] Assignee Sony Corporation
Tokyo, Japan
a corporation of Japan
[32] Priority Feb. 14, 1968
[33] Japan
[31] Nos. 43/9334 and 43/9335

[54] COLOR VIDEO SIGNAL GENERATING APPARATUS
6 Claims, 12 Drawing Figs.

[52] U.S. Cl. .......... 178/5.4
[51] Int. Cl. .......... H04n 9/04
[50] Field of Search .......... 178/5.2, 5.4, 5.4STC

[56] References Cited
UNITED STATES PATENTS
2,865,985 12/1958 Borkan et al. .......... 178/5.4(STC)
3,502,799 3/1970 Watanabe .......... 178/5.4(STC)

*Primary Examiner*—Richard Murray
*Attorneys*—Lewis H. Eslinger and Curtis, Morris, Safford

ABSTRACT: A video signal-generating apparatus employing two image pickup tubes to produce color video signals of high resolution. The output of a first image pickup tube for producing a luminance signal and a composite luminance signal component derived from a second image pickup tube for producing color video signals are combined together so that the color video signals of narrow band from the second image pickup tube are mainly compensated for by the luminance signal produced by the first image pickup tube to provide color video signals of wide band.

INVENTORS
SATOSHI SHIMADA
YASUHARU KUBOTA

BY Lewis H. Eslinger
ATTORNEYS

COLOR VIDEO SIGNAL GENERATING APPARATUS

BACKGROUND OF THE INVENTION

The prior art has proposed various means for producing color video signals by the employment of two image pickup tubes. The problem facing the industry with the prior mechanisms is that they produce poor resolution, especially in the peripheral or marginal portion of a reproduced picture. Various designs have been suggested to improve the resolution characteristics, however, such devices are expensive and cannot be used in ordinary color television transmission.

SUMMARY OF THE INVENTION

In accordance with the present invention, the output of a first image pickup tube for producing a luminance signal and a composite luminance signal component derived from a second image pickup tube for producing color video signals are combined such that the color video signals of narrow band from the second image pickup tube are mainly compensated for by the luminance signal produced by the first image pickup tube to provide color video signals of wide band width. Consequently, when the output of the first image pickup tube is of high resolution, then the output of the second image pickup tube need not be so high and color-separating means such as a color filter, lenticules and so on employed therein do not require high precision and can be of the inexpensive variety. Our invention also makes possible a high resolution at the peripheral or marginal portion of the reproduced picture.

Accordingly it is an object of this invention to provide a color video signal-generating apparatus of the type employing two image pickup tubes which produce color video signals of high resolution.

Another object of this invention is to provide a color video signal-generating apparatus which is simple in construction and is capable of producing wideband color video signals.

Another object of this invention is to provide an apparatus for producing color video signals of wide band compensated for by a wide bank luminance signal derived from an image pickup tube for the luminance signal.

Other objects, features and advantages of the invention will become apparent from the following description taken in conjunction with the accompanying drawings, in which:

DESCRIPTION OF THE PREFERRED EMBODIMENTS

Figure 1:
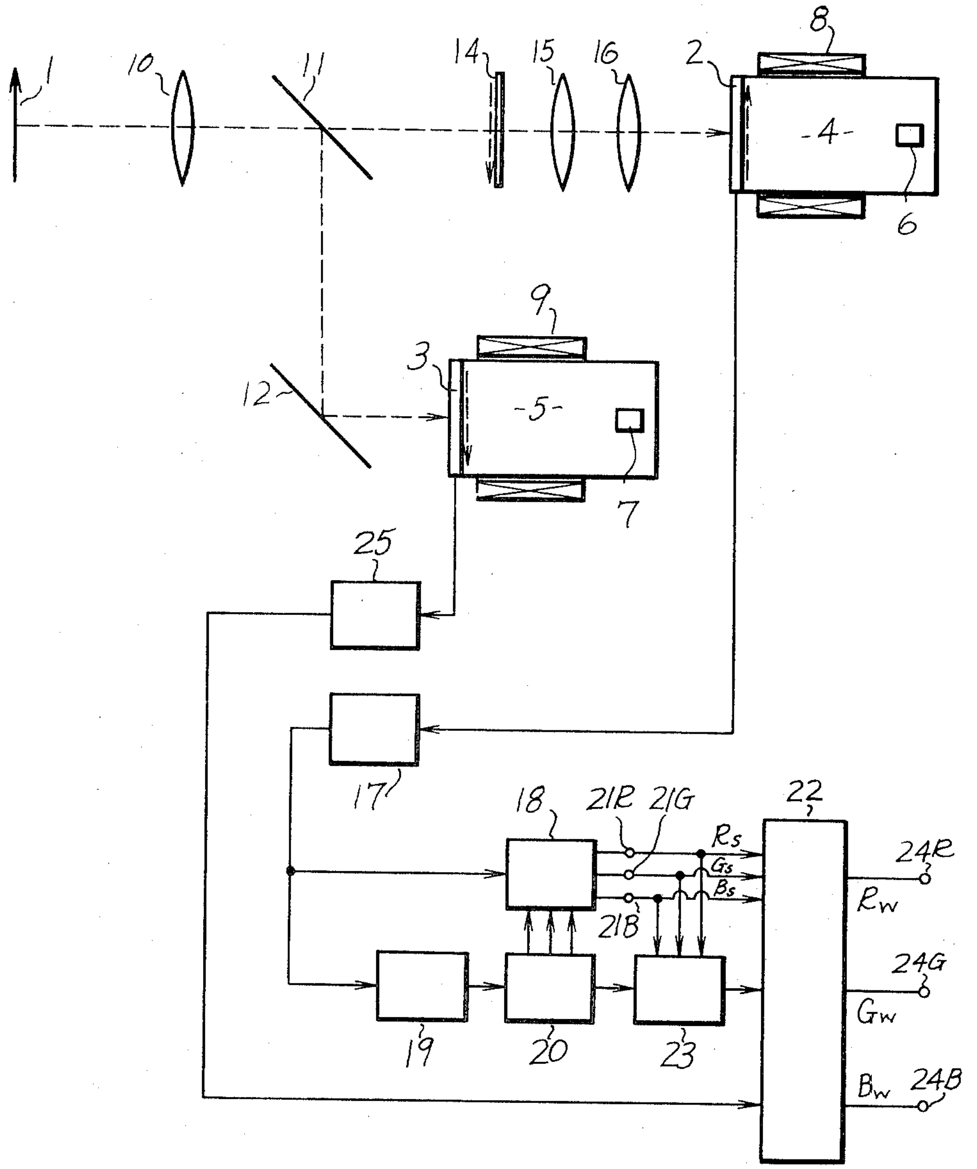
FIG. 1 is a system diagram of a color video signal-generating apparatus in accordance with this invention.

Referring to FIG. 1 there is shown an image 1 which is to be televised. The real images of image 1 are respectively projected onto photoconductive layers 2 and 3 of image pickup tubes 4 and 5. In the embodiment shown in FIG. 1 the image pickup tubes 4 and 5 are vidicon tubes which respectively comprise electron guns 6 and 7 and deflection means 8 and 9. In order to form the images of the object 1 on the photoconductive layers 2 and 3, a semitransparent mirror, dichroic mirror a prism or the like is positioned in the optical path between the image 1 and the photoconductive layer 2 and can be disposed rearwardly of a camera lens 10. In the FIG. 1 embodiment, a semitransparent mirror 11 is used. The light which is reflected from the mirror 11 is again reflected by a mirror 12 which projects the reflected light onto the photoconductive layer 3 for generating a luminance signal. A striped color filter 14, consisting of a plurality of strip color-filter elements of different wave length band characteristics, is placed in an optical path between the semitransparent mirror 11 and the photoconductive layer 2 so as to produce a striped color-separated image of the object 1 on the photoconductive layer 2 of the image pickup tube 4. The real image of the object 1 is formed at the position of the striped color filter 14 and is projected onto the photoconductive layer 2 by a field lens 15 and a relay lens 16.

Figure 2:
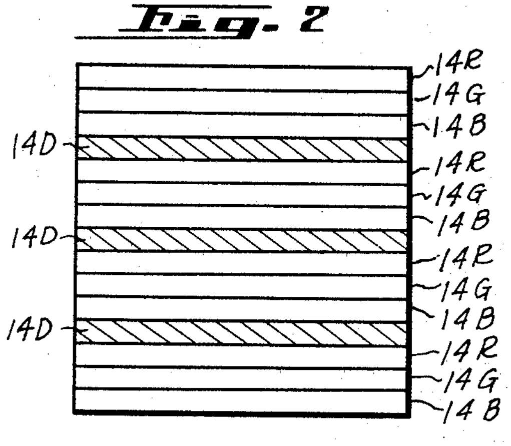
FIG. 2 is a fragmentary plan view schematically illustrating one example of a striped color filter employed in the FIG. 1 embodiment.

FIG. 2 schematically illustrates one example of the color filter 14, which consists of red color bands 14R which permit the passage of red color light therethrough; green color bands 14G which permit the passage of green color light therethrough; blue color bands 14B which permit the passage of blue color light therethrough and opaque bands 14D which are index-forming elements inhibiting the passage of all color lights therethrough. All of the color bands are arranged in a repeating cyclic order. Since the real image of the object 1 is formed on the striped color filter 14, an image of the object 1 separated into color components is obtained at the position of the color filter 14 and this image is projected by the relay lens 16 onto the photoconductive layer 2 of the image pickup tube 4.

By scanning such a striped color-separated image on the photoconductive layer 2 with an electron beam from the electron gun 6 in such a manner that the electron beam scanning direction may cross the stripes or bands formed by image elements of the image separated into color components, dot-sequential color signals are produced. The color signals thus produced are applied to a sampling circuit 18, if necessary, through an amplifier circuit 17 as shown in FIG. 1. A portion of the color signals from the amplifier circuit 17 is fed to an index signal detector circuit 19 to detect an index signal produced corresponding to an image of the index-forming elements 14D of the color filter 14. The detected index signal is fed to a sampling signal-generating circuit 20 to produce sampling pulses sequentially displaced in phase corresponding to the positions of the image of the color-iflter elements 14R, 14G and 14B. Sampling pulses are then applied to a sampling circuit 18 to be individually sampled, producing red, green and blue color signals $R_s$, $G_s$ and $b_s$ from output terminals 21R, 21G and 21B of the sampling circuit 18. The luminance signal derived from the photoconductive layer 3 of the image pickup tube 5 is produced in the form of a signal $Y_w$ through an amplifier 25. The photoconductive layer 3 is adapted to produce relatively wide band components to thereby detect the object 1 to the details thereof in the form of signals, and the photoconductive layer 2 is designed to yield color components of relatively wide band.

Each primary color signal is separated from color signals of repeating frequencies of the bands of the color-separated image of the object 1, and the relatively narrow band primary color signals are combined together to provide a composite luminance signal of narrow band. A signal is produced which corresponds to the ratio of the wide band luminance signal derived from the photoconductive layer 3 of the tube 5 to the composite luminance signal, and then this signal is multiplied by the aforementioned primary color signals respectively to produce correcting signals. To accomplish the latter, the primary color signals $R_n$, $G_n$ and $B_n$ derived from output terminals 21R, 21G and 21B of the sampling circuit 18 are respectively applied to a matrix circuit 22, and simultaneously therewith are fed to a mixer circuit 23 to obtain therefrom a composite luminance signal $\alpha R_s + \beta G_s + \gamma B_s = Y_s$. It is preferred that $\alpha + \beta + \gamma = 1$. The narrow band composite luminance signal $Y_s$ derived from the mixer circuit 23 is applied to the matrix circuit 22, and the wide band luminance signal $Y_w$ derived from the amplifier 25 is similarly fed to the matrix circuit 22. In the matrix circuit 22, the primary color signals $R_s$, $G_s$ and $B_s$ are respectively multiplied by $\frac{Y_w}{Y_s}$ to respectively provide corrected red, green and blue signals $$R_w = R_s \times \frac{Y_w}{Y_s}, G_w = G_s \times \frac{Y_w}{Y_s} \text{ and } B_w = B_s \times \frac{Y_w}{Y_s}$$

at the output terminals 24R, 24G and 24B.

With the color video signal generating apparatus of this invention, the wideband luminance signal $Y_w$ is multiplied by the relatively narrow band primary color signals obtained from the striped color-separated image of the object in the matrix circuit 22 so that the frequency components of the primary color signals $R_w$, $G_w$ and $B_w$ derived from the matrix circuit 22 are respectively dependent upon the wideband luminance signals obtained from the photoconductive layer 3 to provide wideband color signals. Even if the striped color separated image is partially defocused at the peripheral portion of the photoconductive layer 2 of the image pickup tube 4 and one portion of each of the levels of the primary color signals $R_s$, $G_s$ and $B_s$ corresponding to the defocussing decreases, the signal levels become substantially the same as those of signals, which do not introduce defocussing at any portion of the photoconductive layer 2. This is so since the primary color signals have been divided by the composite luminance signal $Y_s$ to compensate for the reduction of their levels. In addition, the characteristics of the primary color signals have been caused to be dependent upon the luminance signal derived from the Photoconductive layer 3 of the image pickup tube 5 for generating the luminance signal so that even if a slight difference is present between the photoconductive layers 2 and 3, the image on the photoconductive layer 2 follows that on the photoconductive layer 3 to insure correction of any misregistration.

For example, in the case where the image pickup tube 4 for the color signals is a vidicon tube having a photoconductive layer formed of antimony trisulfide which exhibits relatively excellent color characteristics and the image pickup tube 5 for the luminance signal is a Plumbicon tube having a photoconductive layer formed of lead oxide which is of relatively excellent residual image characteristics, only the excellent features of the both photoconductive layers can be obtained by the matrix circuit 22. Thus a highly efficient color video signal-generating apparatus can be obtained which is free of the drawbacks such as high visual persistence encountered in the vidicon tube and low sensitivity to red color light experienced in the Plumbicon tube. Moreover, with the use of the vidicon tube for the image pickup tube 4 and an image orthicon tube for the image pickup tube 5, the so-called $\gamma$ (gamma) characteristics of the color signals can be rendered dependent upon that of the luminance signal, although the $\gamma$ (gamma) characteristics of the two tubes are greatly different. Thus, the color video signal-generating apparatus of this invention employs two photoconductive layers to derive color signals of a striped color-separated image from one of the photoconductive layers and a wide-band luminance signal from the other, and the aforementioned correcting operations are effected by the both signals in the matrix circuit to ensure provision of color signals of excellent characteristics.

Figure 3:
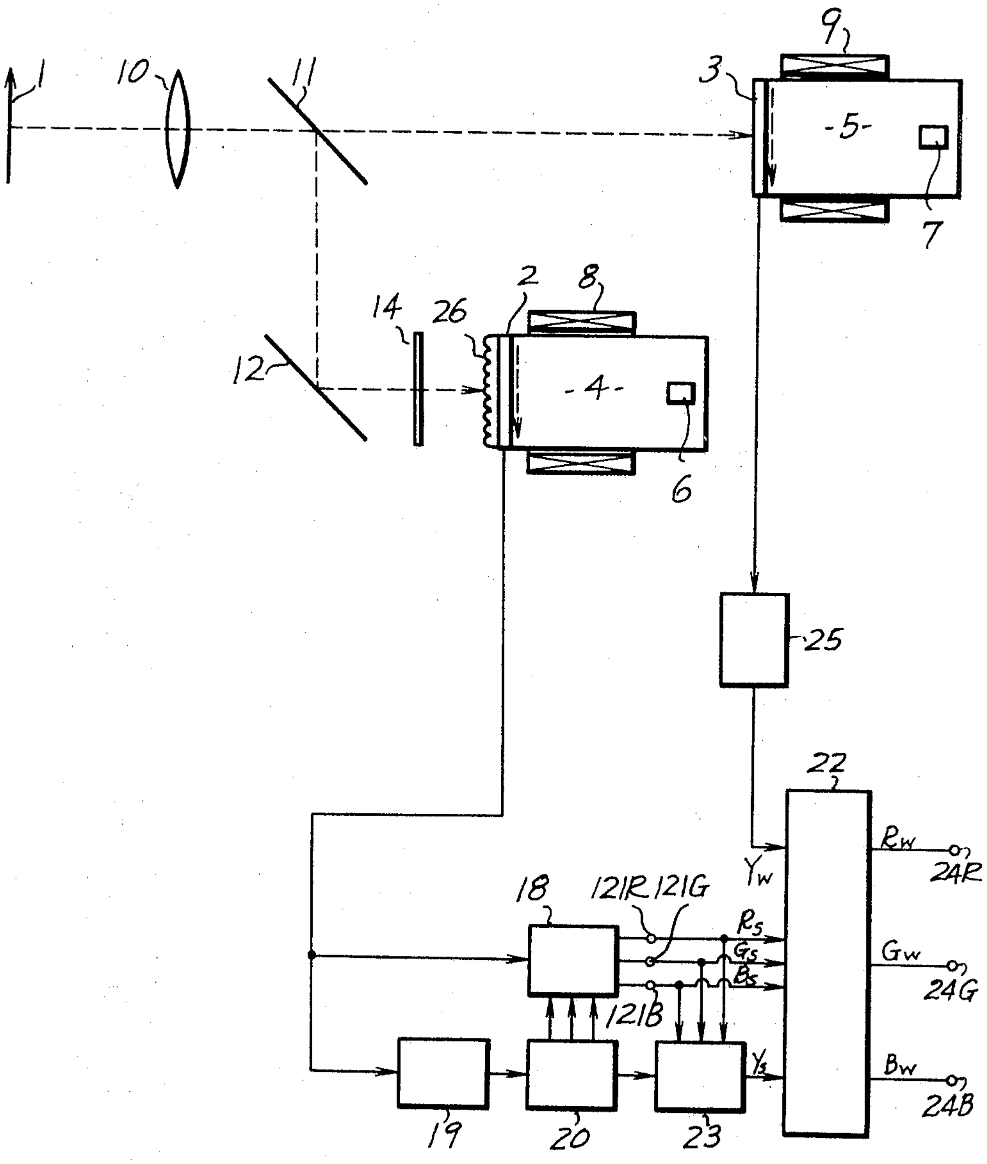
FIG. 3 is a second embodiment of the invention.

In the foregoing, a real image of the object is formed on the striped or banded color filter 14 and is then projected onto the photoconductive layer 2 by the field lens 15 and the relay lens 16 so as to produce the striped color-separated image on the photoconductive layer 2; however, the striped color-separated image may be directly formed on the photoconductive layer 2. This can be achieved by the employment of a lens screen 26 shown in FIG. 3, consisting of a plurality of lens elements, for example, many cylindrical lenses sequentially arranged, which is disposed in an optical path between the color filter 14 and the photoconductive layer 2. In this case the lens screen 26 comprised of the cylindrical lenses is placed in parallel with the color-filter elements of the striped color filter in such a manner that the image of the color filter 14 is projected onto the photoconductive layer 2 by each of the cylindrical lenses of the lens screen 26. Of course, the real image of the object 1 is formed on the photoconductive layer 2 of the first image pickup tube 4 and accordingly the striped color-separated image of the object 1 is produced on the photoconductive layer 2. In FIG. 3 similar elements to those in FIG. 1 are identified by similar reference numerals and further explanation is omitted for the sake of simplicity.

Figure 5A:
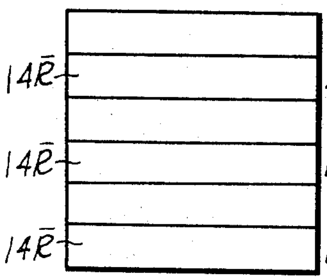
FIGS. 5A, 5B and 5C are plan views showing one embodiment of a color filter employed in the apparatus shown in FIG. 4.
Figure 5B:
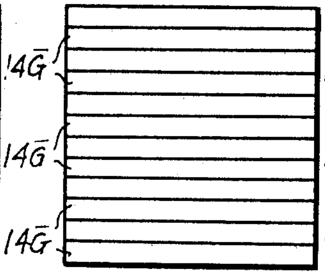
Figure 5C:
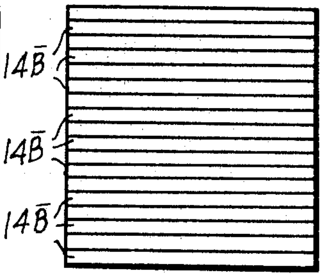
Figure 4:
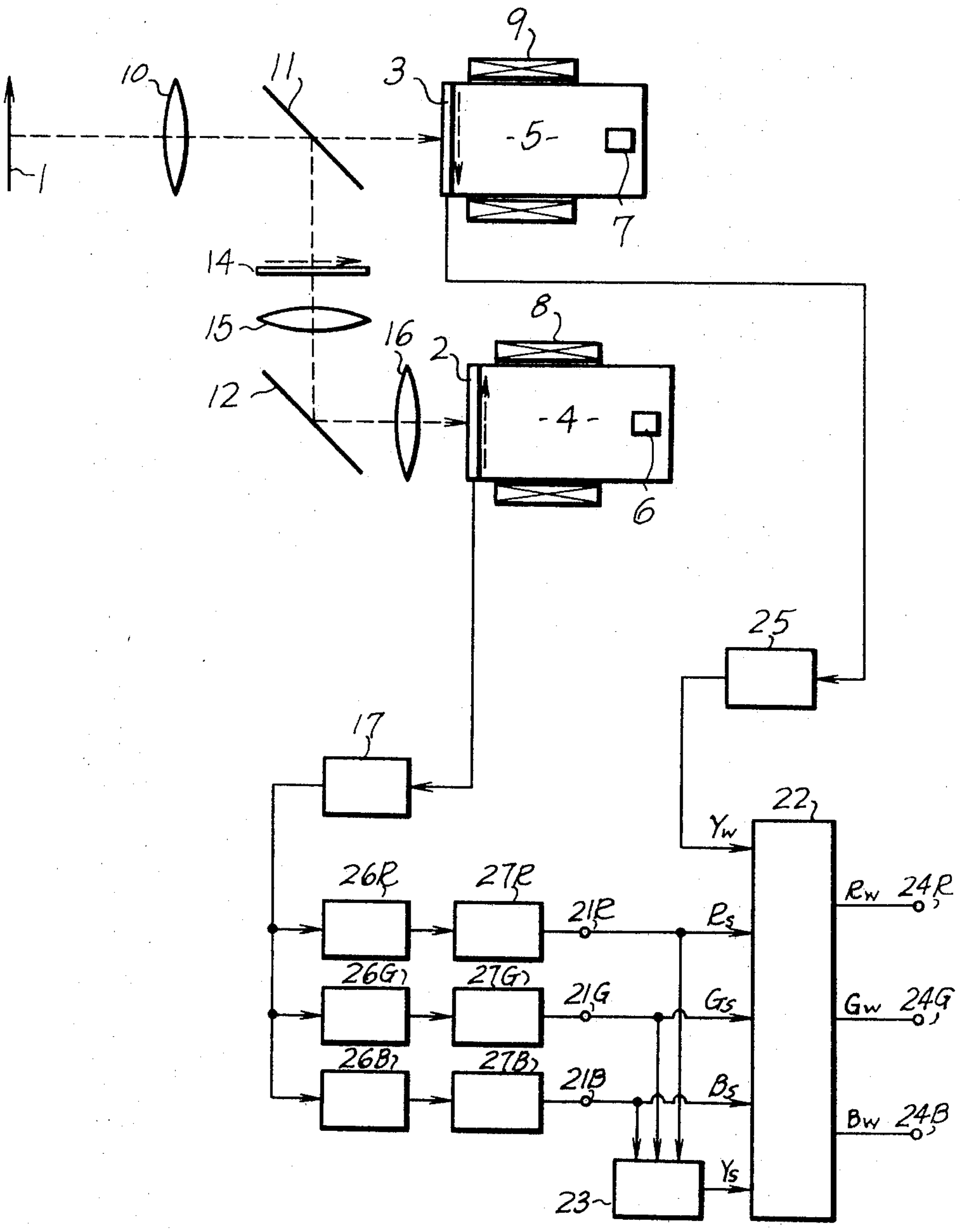
FIG. 4 is a third embodiment of the invention.

Although separation of the color signals is effected by sampling the color signals from the first image pickup tube 4 with the sampling pulses derived from the index signals in the foregoing, the primary color signal components $R_s$, $G_s$ and $B_s$ can be obtained by deriving signals of frequencies equal to the carrier frequencies of the color signals from the index signals and by synchronous detection of the color signals with the above signals being displaced in phase. Further, it is possible to form the striped color image of the object 1 in such a manner not only to displace the color signal components in phase as above mentioned but also to separate them according to their particular frequencies. For example, as illustrated in FIG. 4, the color filter 14, on which the real image of the object 1 is formed, may be of the type which consists of a banded filter member having three cyan color filter elements 14R of equal width, a banded filter member having six-magenta color-filter elements 14G of equal width and a banded-filter member having nine yellow color-filter elements 14B of equal width, as shown in FIGS. 5A, 5B and 5C, the banded-filter members being arranged in parallel relation to one another. In such a case, the color signals from the photoconductive layer 2 of the first image pickup tube 4 are respectively applied to a band-pass filter 26R as shown in FIG. 4 having a center frequency $f_2$ corresponding to the repeating frequency of images of, for example, the cyan color-filter elements 14R, a band-pass filter 26G having a center frequency $2f_2$ and a band-pass filter 26B having a center frequency $3f_2$. The outputs of the band-pass filters 26R, 26G and 26B are respectively detected by detector circuits 27R, 27G and 27B to provide primary color signal components $R_s$, $G_s$ and $B_s$ from output terminals 21R, 21G and 21B of the detector circuits. Since the other elements are identical with those in FIG. 1, they are identified by the same reference numerals and no additional description need be given. Further, such color signal separation according to their frequencies can similarly be achieved by the use of the aforementioned lens screen 26 in such a manner to provide the striped color-separated image of the object.

Figure 7:
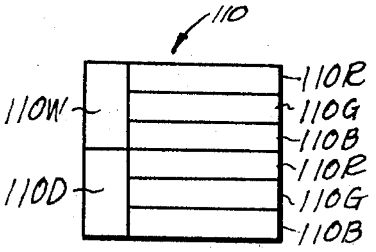
FIG. 7 is a striped color filter used in the FIG. 6 embodiment.
Figure 6:
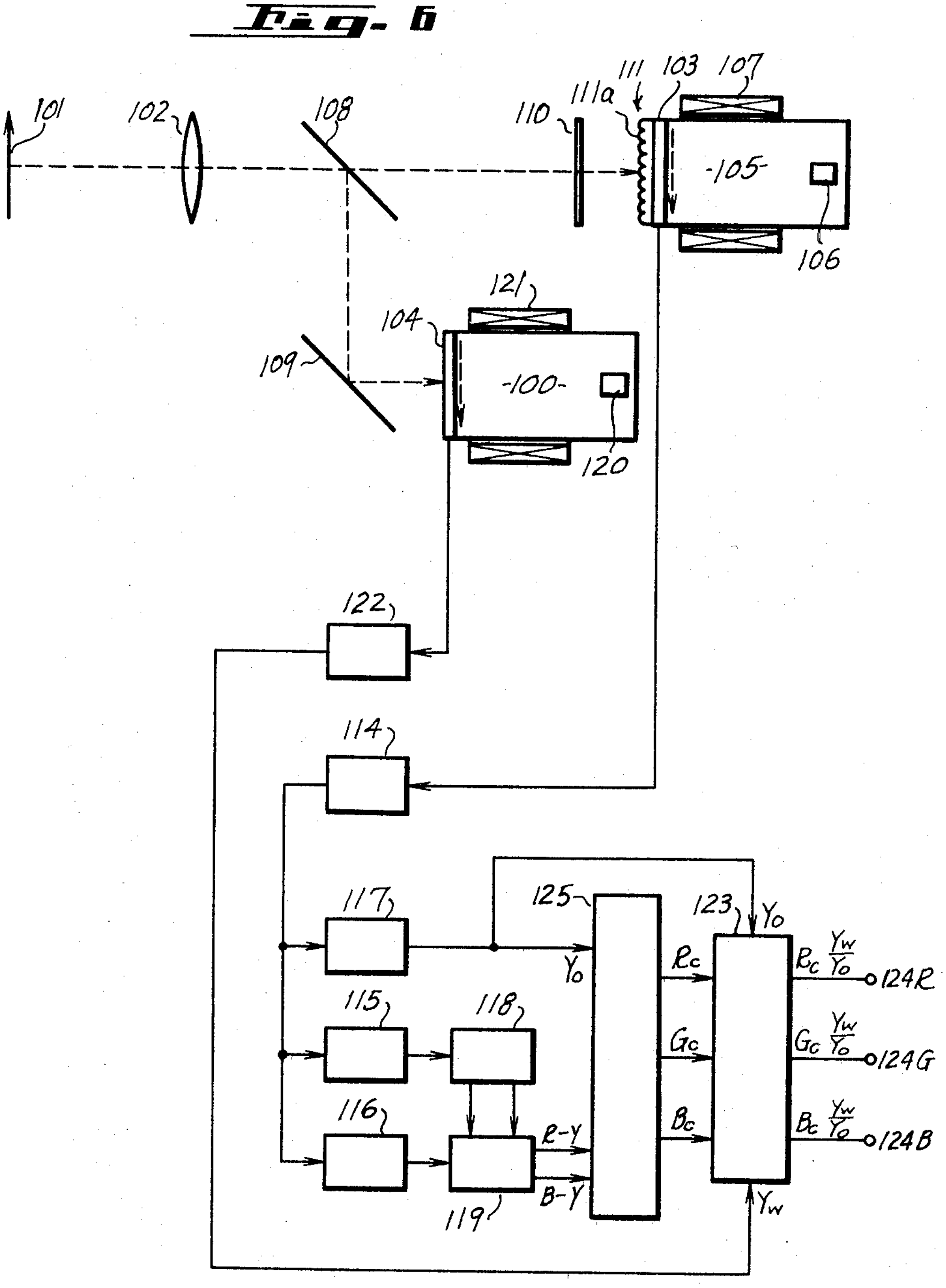
FIG. 6 is a diagram showing a fourth embodiment of the invention.

In FIG. 6 there is illustrated a modified form of this invention, in which reference numeral 101 indicates an object to be televised, whose image is projected by a camera lens 102 onto photoconductive layers 103 and 104 of vidicon tubes 105 and 100. The vidicon tube 105 comprises an electron gun 106 disposed adjacent the end of the envelope remote from the photoconductive layer 103 and an electron beam deflection means 107. For example, a semitransparent mirror 108 is disposed in an optical path between the object 101 and the photoconductive layer 103 and reflected light from the mirror 108 is again reflected by a mirror 109 to be directed to the photoconductive layer 104 of the vidicon tube 100. A banded color filter 110 consisting of a plurality of strips of color-filter elements of different wave length band characteristics is located in an optical path between the semitransparent mirror 108 and the photoconductive layer 103 of the vidicon tube 105. The color filter 110 is such as exemplified in FIG. 7, which consists of two strips of red color-filter elements 110R permitting primarily the passage of red color light therethrough, two strips of green color-filter elements 110G permitting primarily the passage of green color light therethrough and two strips of blue color-filter elements 110B permitting primarily the passage of blue color light therethrough. The strip color-filter elements are substantially the same width and sequentially arranged in parallel relation in such a repeating cyclic order that there are successively one red color-filter element 110R, one green color-filter element 110G, one blue color-filter element 110B, then the other red color-filter element 110R and so on as shown in FIG. 7. Further, the color filter 110 includes a white transparent region 110W located on one side of the array of filter elements and an opaque region 110D adjacent the transparent region so as to produce index signals representative of the repetition of the array of the color-filter elements.

Figure 8:
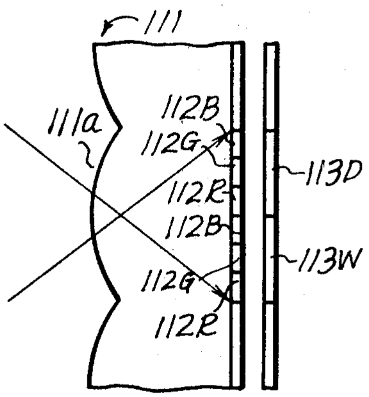
FIG. 8 is a fragmentary cross-sectional view schematically illustrating the manner in which each image element of an object to be televised is separated into color components by each cylindrical lens of a lens screen.

A lens screen 111 consisting of many cylindrical lenses 111*a* is disposed in an optical path between the color filter 110 and the photoconductive layer 103 of the vidicon tube 105 as shown in FIG. 6. In this case, the lens screen 111 is arranged with the cylindrical lenses 111*a* lying in parallel with the color-filter elements of the color filter 110. With such an arrangement, one image of the color filter 110, having the same width as one cylindrical lens 111*a*, is formed by each cylindrical lens, so that images 112R, 112G and 112B shown in FIG. 8 of the color filter elements 110R, 110G and 110B are formed on the photoconductive layer 103 at one-half pitch of the cylindrical lenses 111*a*. In addition, there are formed bright and dark images 113W and 113D respectively corresponding to the positions of the transparent and opaque regions 110W and 110D, with the result that stripes of the bright and dark areas overlap the images of the color-filter elements.

Thus, the image 112 of The resulting color filter 110 and that of the object 101 are simultaneously formed on the photoconductive layer 103 while being overlapped by each other, which indicates that the image of the object 101 has been separated into color components in stripes. Color signals are produced by scanning the color-separated image with an electron beam in such a manner that the horizontal scanning direction may cross the stripes of the image. The resulting color signals from the photoconductive layer 103 are amplified by an amplifier 114, if necessary, and are then applied respectively to a narrow-band filter 115 having a pass band of the repeating frequency $f_L$ of the aforementioned striped bright and dark images 113W and 113D, a relatively wide-band filter 116 having a pass band of a frequency $2f_L$ double that of the repeating frequency $f_L$ and a low-pass filter 117 having a cutoff frequency lower than $2f_L$. An index signal is derived from the narrow-band filter 115 and is frequency-multiplied twice by a multiplier circuit 118 to be a carrier for synchronous detection having a suitable phase, and thereafter being fed to a synchronous detector circuit 119. The synchronous detector circuit 119 is supplied with the output of the band pass filter 116 to produce, for example, a red color difference signal R–Y and a blue color different signal B–Y The vidicon tube 100 for generating a luminous signal comprises an electron gun 120 and an electron beam deflection means 121 and the luminance signal is applied to an amplifier 122. The color difference signals R–Y and B–Y from the synchronous detector 119 and an output $Y_0$ of the low-pass filter 117 are fed to a matrix circuit 125, from which are derived red, green and blue color component signals $R_c$, $G_c$ and $B_c$.

In the present example one portion of the output $Y_O$ of the low-pass filter 117 is fed to a compensating operational circuit 123 and a luminance signal $Y_W$ from the amplifier 122, the color component signals $R_c$, $G_c$ and $B_c$ from the matrix circuit 125 are respectively applied to the operational circuit 123. The operational circuit 123 operates the product of a signal $Y_W/Y_O$ corresponding to the ratio of the luminance signal $Y_W$ to the signal $Y_O$ and the respective color component signals to produce $R_o\times\frac{Y_W}{Y_O}$, $G_o\frac{Y_S}{Y_O}$ and $B_o\times\frac{Y_W}{Y_O}$ from output terminals 124R, 124G and 124B of the circuit 123 respectively.

With such an arrangement, as has been described in the foregoing, the color component signals $R_c$, $G_c$ and $B_c$ obtained from the striped color-separated image are multiplied by the signal corresponding to the ratio of the signal $Y_O$ to the wide-band luminance signal $Y_W$, thereby providing the color signal outputs. Consequently, even if the frequency bands of the color component signals $R_c$, $G_c$ and $B_c$ are relatively narrow, the primary color signals R, G and B dependent upon the luminance signal $Y_W$ can be derived from the output terminals 124R, 124G and 124B, so that details of the object 1 can also be reproduced. Further, since the color component signals $R_c$, $G_c$ and $B_c$ may be narrow-band signals as mentioned above, the stripes of the color-separated image of the object 101 may be large and those of the color-filter elements of the color filter 110 may also be large, and accordingly this facilitates the making of the color filter. In addition, the stripes of the color-separated image may be large as mentioned above, so that the lens for projecting the image of the color filter 110 onto the photoconductive layer 103 need not be a high precision type.

Figure 9:
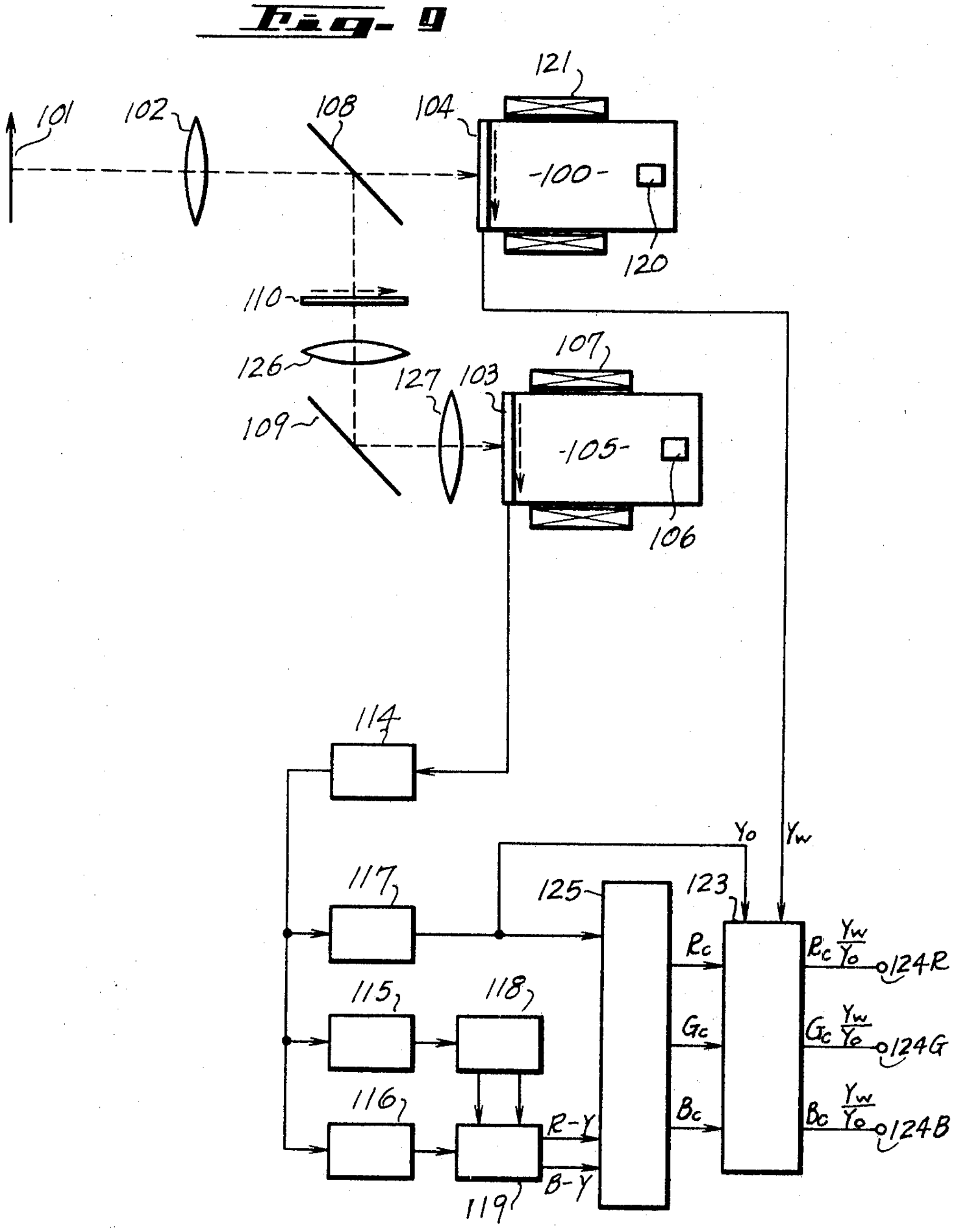
FIG. 9 is a diagram showing a fifth embodiment of the invention.

FIG. 9 illustrates a further modification of this invention, in which light reflected by a semitransparent mirror 108 is directed to a color filter 110 to form thereon a real image of an object and the image is projected by a field lens 126, a mirror 109 and a relay lens 127 onto a photoconductive layer 103 for generating color signals. In this case, however, the color filter 110 consists of a plurality of color-filters elements sequentially arranged in a much repeated cyclic order. It will readily be understood that the use of such an optical system provides a color-separated image of the object 101 on the photoconductive layer 103.

Figure 10:
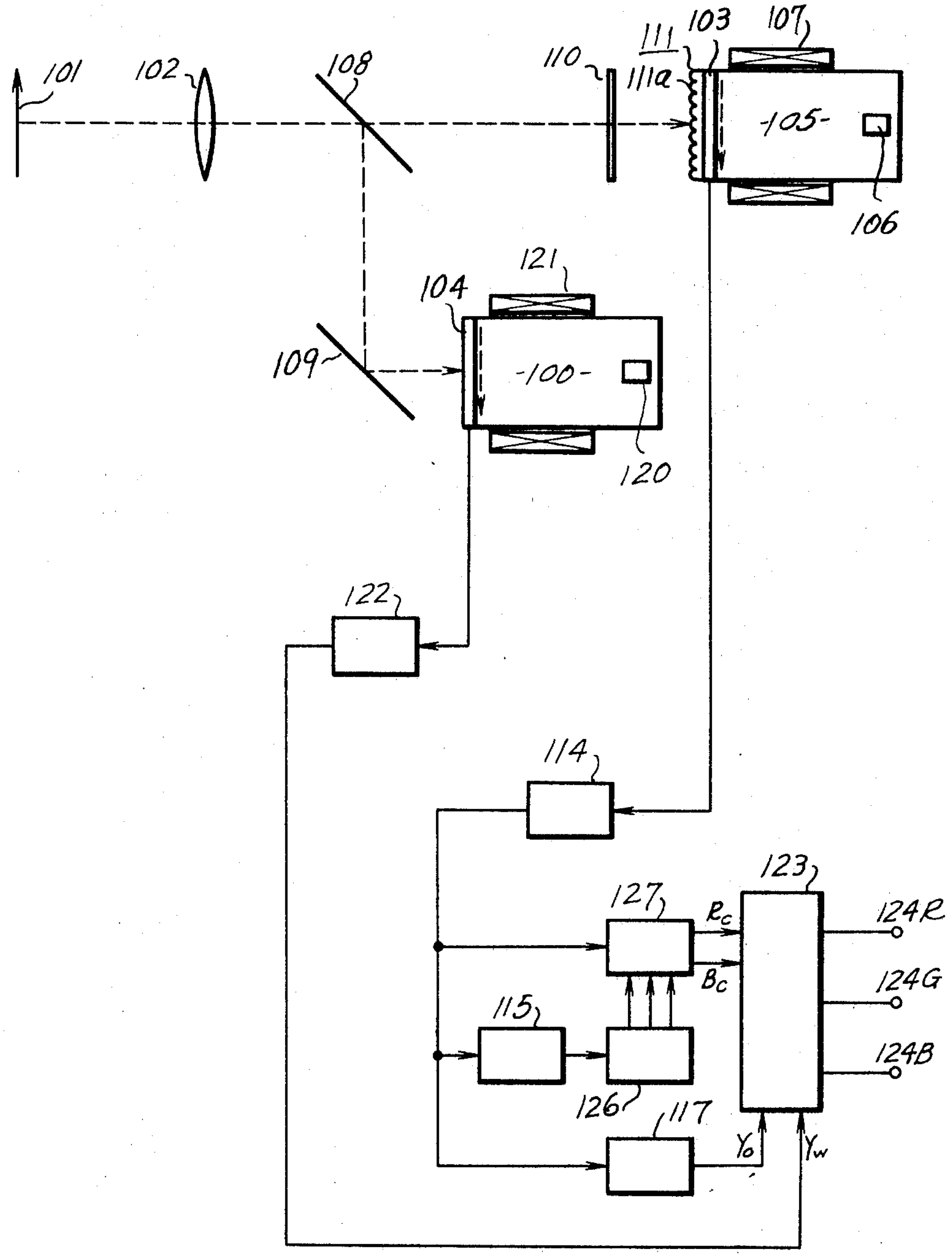
FIG. 10 is a diagram showing a sixth embodiment of the invention.

While the color difference signals of the respective color components are separated by synchronous detection of the color carrier signals derived from the striped color-separated image in the foregoing, it may be achieved by means of sampling. For example, as shown in FIG. 10, the output of an index signal separator circuit 115 is fed to a sampling pulse-forming circuit 126 to produce sampling signals suitably displaced in phase corresponding to the respective color signals and the sampling signals are applied to a sampling circuit 127, which is supplied with color signals from an amplifier 114. In the sampling circuit 127, signals corresponding to the images of the respective color-filter elements are sampled to provide color component signals $R_c$, $G_c$ and $B_c$. Although the carriers are displaced in phase according to the color components in the foregoing, separation of the color component signals may be achieved by rendering their frequencies different. In such a case, the color filter 110 consists of a banded cyan color-filter member including three stripelike cyan color-filter elements, a banded magenta color-filter member including six stripelike magenta color filter elements and a banded yellow color filter member including nine stripe-like yellow color-filter elements, the color-filter members being arranged in overlapping relation with the filter elements lying in parallel with one another. The color signals from the amplifier 114 are respectively applied to a band-pass filter of a frequency centering on a repeated frequency $f_L$ of images of the cyan color-filter elements, a band-pass filter of a frequency centering on $2f_L$ and a band-pass filter of a frequency $3f_L$. The outputs of the filters individually detected to provide signals $R_c$, $G_c$ and $B_c$.

In the foregoing the primary color signals $R_c$, $G_c$ and $B_c$ are produced as the color signal components, but it is also possible to multiply the color difference signals R–Y and B–Y by $YW/Y_O$.

While there has been shown and described a particular embodiment of this invention, it will be obvious to those skilled in the art that various changes and modifications can be made therein without departing from the invention, and therefore, it is intended in the appended claims to cover all such changes and modifications as fall within the true spirit and scope of the invention.

We claim:

1. A color video signal-generating apparatus comprising, a first image pickup tube, means for projecting an image of an object to be televised onto the first image pickup tube, a circuit for deriving from the first image pickup tube a first luminance signal corresponding to the image of the object, a second image pickup tube, means for projecting a color-separated image of the object onto the second image pickup tube, means for deriving from the second image pickup tube a plurality of color video signals based on the color-separated image of the object, means for deriving a second luminance signal from the second image pickup tube, a circuit for producing a signal representative of the ratio of the first luminance signal to the second one, and a circuit for producing a signal corresponding to the product of the color video signals and the signal representative of the ratio of the first luminance signal to the second one.

2. A color video signal-generating apparatus as defined in claim 1 wherein the second luminance signal is a composite signal of the color video signals.

3. A color video signal-generating apparatus as defined in claim 1 wherein the the second luminance signal is a low frequency output component of the second image pickup tube.

4. A color video signal-generating apparatus as defined in claim 1 wherein the means for projecting the color-separated image onto the second image pickup tube comprises a color filter consisting of a plurality of color-filter elements.

5. A color video signal-generating apparatus as defined in claim 1 wherein the means for projecting the color-separated image onto the second image pickup tube includes a color filter consisting of a plurality of color-filter elements and a lens screen consisting of a plurality of cylindrical lenses.

6. A color video signal-generating apparatus as defined in claim 5 wherein the color-filter elements lie in parallel relationship with the cylindrical lenses of the lens screen.